US012152545B2

(12) United States Patent
Toth et al.

(10) Patent No.: US 12,152,545 B2
(45) Date of Patent: Nov. 26, 2024

(54) METHOD FOR OPERATING AN INTERNAL COMBUSTION ENGINE, AND INTERNAL COMBUSTION ENGINE CONFIGURED TO CARRY OUT SUCH A METHOD

(71) Applicant: Rolls-Royce Solutions GmbH, Friedrichshafen (DE)

(72) Inventors: Aron Toth, Friedrichshafen (DE); Tobias Frank, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/516,352

(22) Filed: Nov. 21, 2023

(65) Prior Publication Data

US 2024/0084749 A1 Mar. 14, 2024

Related U.S. Application Data

(63) Continuation of application No. PCT/EP2022/064202, filed on May 25, 2022.

(30) Foreign Application Priority Data

May 26, 2021 (DE) .................. 10 2021 205 361.0
May 25, 2022 (WO) ................. PCT/EP2022/064202

(51) Int. Cl.
*F02D 35/02* (2006.01)
*F02D 41/14* (2006.01)
(Continued)

(52) U.S. Cl.
CPC ....... *F02D 35/027* (2013.01); *F02D 41/1406* (2013.01); *F02D 41/247* (2013.01); *F02D 41/403* (2013.01)

(58) Field of Classification Search
CPC .......... F02B 19/00; F02B 19/10; F01D 41/26; F01D 41/30; F01D 41/3827; F01D 41/40; F01D 41/403
See application file for complete search history.

(56) References Cited

U.S. PATENT DOCUMENTS 4,497,306 A * 2/1985 Hamai ................. F02P 3/0456
123/643
4,967,710 A * 11/1990 Komurasaki ........... F02P 5/152
123/406.16
(Continued)

FOREIGN PATENT DOCUMENTS

DE  10 2005 001 580 A1  7/2006
DE  10 2013 102 783 A1  9/2013
(Continued)

OTHER PUBLICATIONS

International Search Report and Written Opinion dated Sep. 13, 2022 for International Patent Application No. PCT/EP2022/064202 (13 pages).

*Primary Examiner* — John Kwon
(74) *Attorney, Agent, or Firm* — Taylor IP, P.C.

(57) ABSTRACT

A method for operating an internal combustion engine: detecting a first signal from a knock sensor in a temporal measurement window for a first load point and for a first energization duration—assigned to a pre-injection—of an injector for an operating cycle; calculating a first first evaluation point from the first signal by a first metric; detecting a second signal from the knock sensor in the temporal measurement window for the first load point and for a second energization duration—assigned to the pre-injection—of the injector for the operating cycle; calculating by the first metric a second first evaluation point from the second signal; determining an optimum energization duration as an optimum of the first first evaluation point and the (Continued)

second first evaluation point; and storing and/or applying the optimum energization duration to the first load point and the first combustion chamber.

14 Claims, 4 Drawing Sheets

(51) Int. Cl.
*F02D 41/24* (2006.01)
*F02D 41/40* (2006.01)

(56) References Cited

U.S. PATENT DOCUMENTS

| | | | | |
|---|---|---|---|---|
| 5,535,722 A | * | 7/1996 | Graessley | G01L 23/225 |
| | | | | 73/35.11 |
| 7,904,231 B2 | | 3/2011 | Haskara et al. | |
| 2002/0185097 A1 | * | 12/2002 | Ryan, III | F02P 15/08 |
| | | | | 123/143 B |
| 2005/0274352 A1 | * | 12/2005 | Canale | F02D 35/028 |
| | | | | 123/299 |
| 2012/0330534 A1 | * | 12/2012 | Cleeves | F02D 41/10 |
| | | | | 701/104 |
| 2023/0383717 A1 | * | 11/2023 | Neumann | F02P 15/001 |

FOREIGN PATENT DOCUMENTS

| | | |
|---|---|---|
| DE | 10 2016 101 020 A1 | 8/2016 |
| DE | 10 2019 216 054 A1 | 4/2021 |
| WO | 2005/031137 A1 | 4/2005 |

\* cited by examiner

METHOD FOR OPERATING AN INTERNAL COMBUSTION ENGINE, AND INTERNAL COMBUSTION ENGINE CONFIGURED TO CARRY OUT SUCH A METHOD

CROSS REFERENCE TO RELATED APPLICATIONS

This is a continuation of PCT application no. PCT/EP2022/064202, entitled "METHOD FOR OPERATING AN INTERNAL COMBUSTION ENGINE, AND INTERNAL COMBUSTION ENGINE CONFIGURED TO CARRY OUT SUCH A METHOD", filed May 25, 2022, which is incorporated herein by reference. PCT application no. PCT/EP2022/064202 claims priority to German patent application no. 10 2021 205 361.0, filed May 26, 2021, which is incorporated herein by reference.

BACKGROUND OF THE INVENTION

1. Field of the Invention

The present invention relates to a method for operating an internal combustion engine, and an internal combustion engine configured to carry out such a method.

2. Description of the Related Art

When operating an internal combustion engine, it is necessary to keep a peak pressure gradient, in particular the maximum temporal pressure change dp/dt over time, in a combustion chamber below a predefined maximum, optionally below 100 bar/ms, in order to avoid damage in the combustion chamber.

A known measure for influencing the peak pressure gradient is the use of a pre-injection and a primary injection subsequent to the pre-injection. The disadvantage of using pre-injection and primary injection is that the peak pressure gradient is strongly non-linearly dependent on the volume of fuel introduced into the combustion chamber by way of pre-injection, the so-called pre-injection volume. Different peak pressure gradients result in the combustion chamber depending on the pre-injection volume. In particular, depending on the volume of pre-injection, the peak pressure gradient can be lower or higher than in an operation without pre-injection. Generally, a pre-injection peak pressure gradient diagram describes a U-shaped curve. The peak pressure gradient is therein higher for both a lower and a higher pre-injection volume than a medium pre-injection volume, which is higher than the lower pre-injection volume and less than the higher pre-injection volume. At the average pre-injection volume, the peak pressure gradient is optimal, especially minimal. Therefore, if an excessively high peak pressure gradient is detected, it is not immediately apparent whether increasing or decreasing the pre-injection volume can lower the peak pressure gradient.

It is also indispensable to have exact knowledge and error-free and precise control of an injector by way of which the pre-injection is carried out, and thus of the pre-injection volume. Manufacture of such an injector is very time-consuming and expensive due to the necessary minimum manufacturing tolerances and a robust design to avoid aging effects.

In addition, it is advantageous to operate an internal combustion engine in such a way that the respective peak pressure gradient in all combustion chambers is almost identical, optionally identical. If the peak pressure gradients in the individual combustion chambers of an internal combustion engine differ, the crankshaft of the internal combustion engine is in particular subjected to different loads, which can damage the combustion engine.

A known method for determining peak pressure gradients in a combustion chamber utilizes cylinder pressure sensors. The disadvantage of this is that, on the one hand, such cylinder pressure sensors are expensive to manufacture, and on the other hand, correct installation to ensure correct detection of the peak pressure gradient is time-consuming and expensive.

What is needed in the art is a method for operating an internal combustion engine, and an internal combustion engine which is equipped to carry out such a method, wherein the aforementioned disadvantages are at least partially rectified, optionally avoided.

SUMMARY OF THE INVENTION

The present invention provides a method for operating an internal combustion engine having at least one combustion chamber, to which at least one injector is assigned, and which has at least one knocking sensor, wherein in first step (step a) a first signal of the at least one knocking sensor is detected in a first temporal measurement window for a first—in particular stationary—load point and for a first energization duration, assigned to a pre-injection, of the at least one injector for at least one operating cycle of a first combustion chamber. In second step (step b) a first evaluation point is calculated from the at least one first signal by way of a first metric. In a third step (step c), a second signal of the at least one knocking sensor is detected in the first temporal measurement window for the first load point and for a second energization duration of the at least one injector assigned to the pre-injection for at least one operating cycle of the first combustion chamber. In fourth step (step d), a second evaluation point is calculated from at least one second signal using the first metric. In fifth step (step e), an optimum energization duration is determined as the optimum of the first evaluation point and the second evaluation point. In a final step (step f) the optimum energization duration to the first load point and the first combustion chamber is stored and/or applied. Advantageously, the method provides an optimum energization duration for the first load point of the pre-injection of the first combustion chamber. This optimum energization duration depends on age-related functionality and manufacturing tolerances of the injector by way of which the pre-injection is carried out.

Advantageously, the measured values, which are recorded by a knocking sensor, correlate with the pressure gradients in a combustion chamber. In addition, knocking sensors are significantly cheaper and more robust than cylinder pressure sensors. Moreover, the integration of a knocking sensor in an internal combustion engine can easily be implemented.

In the context of the present technical teaching, the optimum is optionally a local optimum. In addition, an optimum value is optionally a local optimum value. The calculation of a global optimum cannot be assured.

The method makes it possible in a simple and cost-effective manner to regulate the peak pressure gradient in the combustion chamber depending on the energization duration of the pre-injection.

The knocking sensor is optionally designed as a structure-borne sound sensor, so that a sound signal from a combustion in the combustion chamber is detected by the knocking sensor and output as an electrical voltage. The greater the amplitude of pressure development in the combustion chamber, the louder the combustion and the higher the amplitude of the electrical voltage emitted by the knocking sensor. Furthermore, the amplitude of the electrical voltage output by the knocking sensor can be used to estimate the peak pressure gradient in the combustion chamber.

In a first optional embodiment, the energization duration is selected in such a way that the peak pressure gradient is minimal. The peak pressure gradient is optionally minimal if the amplitude of the electrical voltage output by the knocking sensor is minimal. This advantageously reduces the component load, and damage to the combustion engine can be effectively prevented.

In a second optional embodiment, the energization duration is selected in such a way that the peak pressure gradient is as close as possible to a predefined limit. Optionally, the amplitude of the electrical voltage output by the knocking sensor is known for the predefined limit value of the peak pressure gradient, so that the evaluation points are compared with the voltage associated with the limit value. The predefined limit value corresponds optionally to a value that is less than a value at which damage occurs to the internal combustion engine. The predefined limit value corresponds especially optionally to a value above which damage to the combustion engine occurs.

In the context of the present technical teachings, the pre-injection is always carried out by way of at least one injector, which is assigned to the respective combustion chamber.

In an optional design, precisely one injector is assigned to the combustion chamber—in particular to each combustion chamber.

In the context of the present technical teaching, an operating cycle optionally corresponds to a crank angle interval between −360° crankshaft angle (KW) and +359.9° KW, based on the ignition TDC at 0° KW.

In the context of the present technical theory, the ignition TDC is the top dead center of a piston moving in the combustion chamber between a compression stroke and a power stroke of the combustion chamber of the internal combustion engine.

A further development of the present invention provides that the inventive method or a method according to one or more of the embodiments described above will be carried out for a majority of different energization durations assigned to the pre-injection. Steps a) and b) or steps c) and d) are carried out in particular for a number of energization durations assigned to the pre-injection, all of which differ from one another, whereby a majority of evaluation points is calculated. The optimum energization duration is determined as the optimum of the majority of evaluation points. This makes it advantageously possible to identify a more precise dependency between energization duration and peak pressure gradients and therefore to determine the optimum energization duration more reliably and accurately.

A further development of the present invention provides that for a majority of operating cycles, optionally at least 10 operating cycles, optionally at least 50 operating cycles, optionally at least 100 operating cycles respectively, the first signal is detected, wherein for a majority of operating cycles, optionally at least ten operating cycles, optionally at least 50 operating cycles, optionally at least 100 operating cycles respectively, the second signal is detected. Consequently, a majority of first signals and a majority of second signals are obtained. Furthermore, the first evaluation point is calculated in step b) from the majority of initial signals using the first metric. In step d), the second evaluation point is calculated from the majority of second signals using the first metric. Depending on the calculation basis of the metric, disturbances and/or anomalies in the measurement of the knocking sensor, which adversely affect determination of optimum energization duration, are advantageously filtered out or made recognizable by the majority of operating cycles.

A further development of the present invention provides that the first temporal measurement window is in a range between −20° KW before ignition-TDC to +60° KW after ignition-TDC. Advantageously, a temporal change in the pressure in the combustion chamber is strongest in this range, in other words, just prior to ignition and after ignition of the fuel.

A further development of the present invention provides that the at least one first signal and the at least one second signal will be evaluated by way of a second metric and/or by way of a third metric.

Furthermore, the optimum energization duration is plausibility checked and/or verified by way of the at least one first signal and at least one second signal evaluated with respect to the second metric and/or third metric. Optionally, a majority of second evaluation points is calculated by way of the second metric. Alternatively, or in addition, a majority of third evaluation points is optionally calculated by way of the third metric. Advantageously, the second metric and/or the third metric are used to check whether the optimum energization duration, which is determined by the first metric, is plausible and reliable. Advantageously, if the optimum energization duration is not clearly determined by use of the first metric, the optimum energization duration can be determined advantageously by use of the second metric and/or the third metric.

A further development of the present invention provides that at least one metric, selected from a group consisting of the first metric, the second metric and the third metric, has an integration formula and a calculation rule. Using the integration formula, at least one signal point is calculated from the at least one signal. By way of the calculation rule, an evaluation point is calculated from at least one signal point.

In particular, at least one first first signal point is optionally calculated from the at least one first signal using the integration formula of the first metric. In addition, using the integration formula of the first metric, at least one second first signal point is optionally calculated from at least one second signal. In addition, the calculation rule of the first metric is optionally used to calculate the first evaluation point from the at least one first signal point. In addition, the calculation rule of the first metric is optionally used to calculate the second first evaluation point from the at least one second first signal point.

In particular, at least one first second signal point is optionally calculated from the at least one first signal by way of the integration formula of the second metric. In addition, the integration formula of the second metric is optionally used to calculate at least one second second signal point from at least one second signal. In addition, a first, second evaluation point is optionally calculated from at least one first, second signal point using the calculation rule of the second metric. In addition, a second second evaluation point is optionally calculated from at least one second second signal point by way of the calculation rule of the second metric.

In particular, at least one first third signal point is optionally calculated from the at least one first signal by way of the integration formula of the third metric. In addition, the integration formula of the third metric is optionally used to calculate at least one second third signal point from the at least one second signal. In addition, a first, third evaluation point is optionally calculated from at least one first, third signal point using the calculation rule of the third metric. In addition, a second third evaluation point is optionally calculated from the at least one second third signal point by way of the calculation rule of the third metric.

In the case of an optional acquisition of a majority of operating cycles, and thus a majority of first signals, the integration formula of the first metric is applied to each first signal individually to calculate a majority of first first signal points. From the majority of the first signal points, the first first evaluation point is calculated using the calculation rule. In addition, in an optional acquisition of a majority of operating cycles and thus a majority of second signals, the integration formula of the first metric is applied to every second signal individually in order to calculate a majority of second first signal points. From the majority of second first signal points, the second first evaluation point is calculated using the calculation rule. In addition, this optionally also applies analogously to the second metric and the third metric.

According to a further development of the present invention, it is provided that the integration formula is selected from a group consisting of an integral over a magnitude of a signal in the first temporal measurement window, an integral over the square of a signal in the first temporal measurement window, an integral over the magnitude of a signal in a second temporal measurement window, which is a part of the first temporal measurement window, and an integral over the square of a signal in the second temporal measurement window.

In an optional embodiment of the method, the second temporal window is in a range between −20° KW before ignition TDC to −3° KW before ignition TDC. It is advantageous to measure the effect of the pre-injection in this range, in particular separately from the effect of the primary injection.

In the context of the current technical teaching, the integration formula is applied to a signal, which is evaluated by way of the first metric, the second metric, or the third metric. Thus, for example, if the at least one first signal is evaluated by the first metric, the integration formula is selected from a group consisting of an integral over the magnitude of the at least one first signal in the first temporal measurement window, an integral over the square of the at least one first signal in the first temporal measurement window, an integral over the magnitude of the at least one first signal in the second temporal measurement window, and an integral over the square of the at least one first signal in the second temporal measurement window. In addition, if a majority of first signals and/or a majority of second signals are detected, the integration formula is applied to each first signal and/or second signal individually.

In addition, the previously discussed comments on the evaluation of a signal by way of the integration formula also apply to all additional signals that are detected by a majority of different energization durations of the pre-injection at an identical load point of the combustion engine with the assistance of the knocking sensor.

A further development of the present invention provides that an average or standard deviation is used as a calculation rule.

Advantageously, an evaluation point in a calculation by way of the average value is an average over all associated signal points. This filters out outliers and disturbances in the measurements by way of the knocking sensor. For example, in a calculation using the average, the first first evaluation point is an average over the majority of first first signal points and, in particular, an average over the majority of operating cycles for which the first signal is acquired.

If only a single first signal is detected and therefore only a single first signal point is calculated, the average value of the first first signal point, and thus the first first signal point itself, is the first first evaluation point. This applies analogously if only a single second signal is detected or respectively, if only a single signal is detected for the majority of energization durations.

In a calculation using the standard deviation, an evaluation point is advantageously a measure of a dispersion of the signal points around the expected value of the signal points. This renders a variance of the measurements and in particular outliers and disturbances of the measurements visible by way of the knocking sensor. If only a single first signal is detected, and thus only a single first first signal point is calculated, the standard deviation of the first first signal point itself, and thus the first first evaluation point, is zero.

The standard deviation is optionally used to check the plausibility of an optimum energization duration, which is determined with a metric that does not use the standard deviation as a calculation rule. If the standard deviation is extensive, this indicates that the individual signal points, and thus also the individual signals that are the basis of the signal points, are very different and widely scattered. Thus, the determination of the peak pressure gradient is not reliable in this case. If the standard deviation is insignificant, optionally approaching zero, this indicates that the individual signal points, and thus the individual signals which are the basis of the signal points, are almost identical. Thus, the determination of the peak pressure gradient is reliable in this case.

First metric $M_1$ is optionally selected from one of the following functions, $F_1$ to $F_4$. The second metric and the third metric are optionally selected from one of the following functions, $F_1$ to $F_8$. $S_i$ specifies a signal of the majority of signals and n the number of operating cycles. Furthermore, $MF_1$ is the first measurement window and $MF_2$ is the second measurement window.

$$F_1(S_i) = \frac{1}{n}\sum_{m=1}^{n}\int_{MF_1}|S_{i,m}|$$

$$F_2(S_i) = \frac{1}{n}\sum_{m=1}^{n}\int_{MF_1}S_{i,m}^2$$

$$F_3(S_i) = \frac{1}{n}\sum_{m=1}^{n}\int_{MF_2}|S_{i,m}|$$

$$F_4(S_i) = \frac{1}{n}\sum_{m=1}^{n}\int_{MF_2}S_{i,m}^2$$

$$F_5(S_i) = \sqrt{\sum_{m=1}^{n}\left(\int_{MF_1}|S_{i,m}| - \frac{1}{n}\sum_{k=1}^{n}\int_{MF_1}|S_{i,k}|\right)^2}$$

$$F_6(S_i) = \sqrt{\sum_{m=1}^{n}\left(\int_{MF_1}S_{i,m}^2 - \frac{1}{n}\sum_{k=1}^{n}\int_{MF_1}S_{i,k}^2\right)^2}$$

$$F_7(S_i) = \sqrt{\sum_{m=1}^{n}\left(\int_{MF_2}|S_{i,m}| - \frac{1}{n}\sum_{k=1}^{n}\int_{MF_2}|S_{i,k}|\right)^2}$$

$$F_8(S_i) = \sqrt{\sum_{m=1}^{n}\left(\int_{MF_2}S_{i,m}^2 - \frac{1}{n}\sum_{k=1}^{n}\int_{MF_2}S_{i,k}^2\right)^2}$$

It is optional if first metric $M_1$, second metric $M_2$ and third metric $M_3$ differ by pairs. "Differ by pairs" means that two metrics selected from first metric $M_1$, second metric $M_2$, and third metric $M_3$ are not identical. In particular, first metric $M_1$, second metric $M_2$ and third metric $M_3$ are selected differently.

In an optional design, $F_1$ or $M_1=F_2$ applies for first metric $M_1$. In addition, $M_2=F_3$ or $M_2=F_4$ is optional for the second metric. In addition, $M_3=F_5$ or $M_3=F_6$ or $M_3=F_7$ or $M_3=F_8$ applies optionally to the third metric.

A further development of the present invention provides that the method according to the present invention or a method according to one or more of the embodiments described above, in particular steps a) to f), will be carried out for different load points of the internal combustion engine. The respective optimum energization durations of the pre-injection are therein advantageously determined and optionally stored for a majority of load points.

A further development of the present invention provides that the method according to the present invention or a method according to one or more of the embodiments described above will be carried out for a majority of combustion chambers of the internal combustion engine. Advantageously, an individual optimum energization duration of the pre-injection is determined for each combustion chamber and optionally stored.

A further development of the present invention provides that the method according to the present invention or a method according to one or more of the embodiments described above will be carried out simultaneously or iteratively for the majority of the combustion chambers.

A further development of the present invention provides that the method according to the present invention or a method according to one or more of the embodiments described above will be repeated cyclically, in particular after a predefined service life of the internal combustion engine. This detects and compensates advantageously for ageing effects of injectors of the combustion chambers, thus optimizing pre-injection and the peak pressure gradient according to the current state of the internal combustion engine.

The present invention also provides an internal combustion engine that has at least one combustion chamber to which at least one injector is assigned, at least one knocking sensor and one control device. The control device is operatively connected to the knocking sensor and to at least one injector and is arranged for their respective control and for carrying out the method according to the present invention or a method according to one or more of the embodiments described above. Associated with the internal combustion engine, there are in particular the advantages that were already explained in the context of the method.

In one optional embodiment, the internal combustion engine has at least one knocking sensor for each combustion chamber. Optionally, an internal combustion engine with 12, 14, 16, 18 or 20 combustion chambers has 12, 14, 16, 18 or 20 knocking sensors and each knocking sensor is assigned to exactly one combustion chamber.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
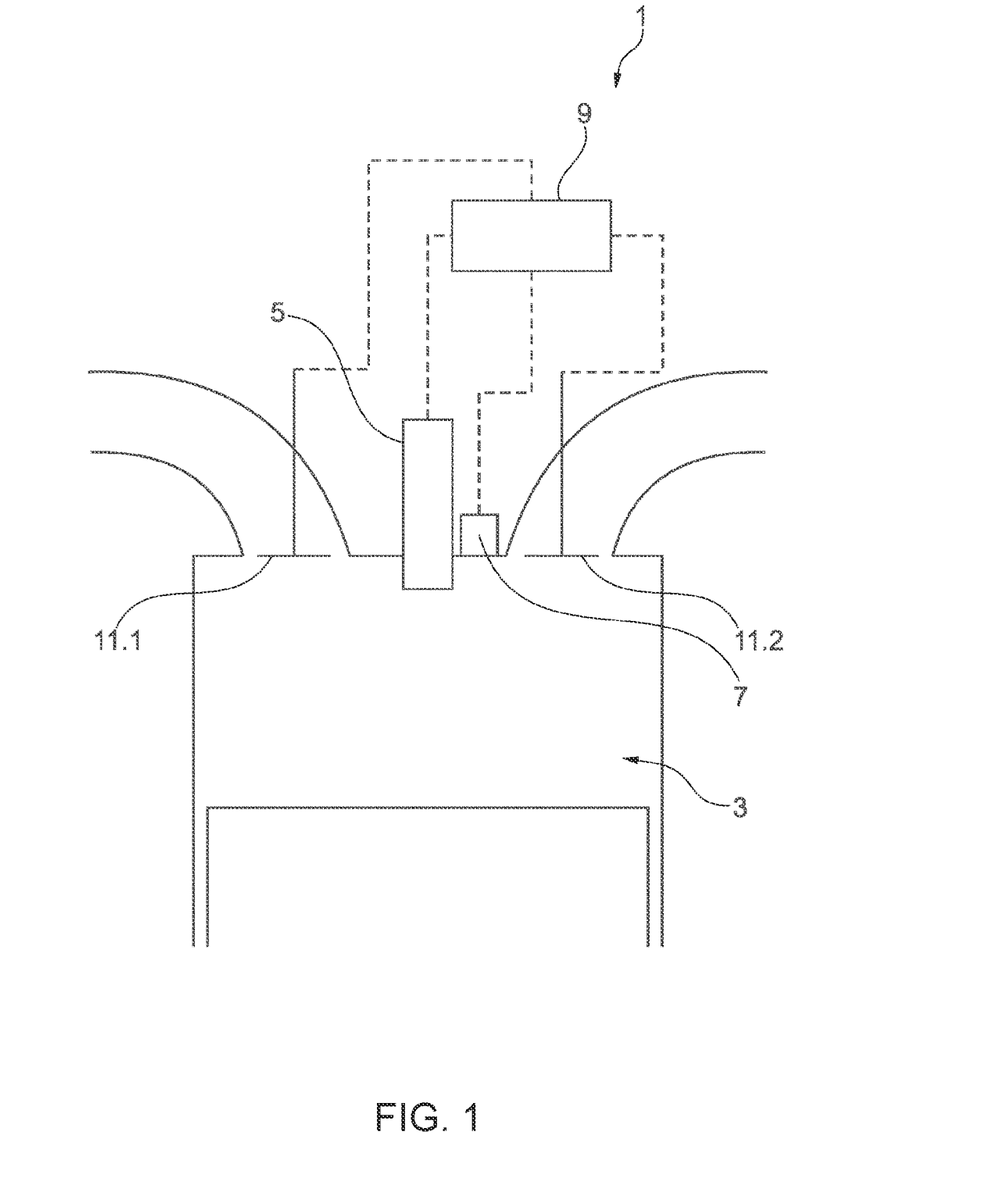
FIG. 1 is a schematic representation of one design of an internal combustion engine.

FIG. 1 shows a schematic representation of a design of an internal combustion engine 1. Internal combustion engine 1 has at least one combustion chamber 3 to which at least one injector 5 is assigned; and at least one knocking sensor 7. In addition, internal combustion engine 1 has a control device 9. Also, combustion chamber 3 optionally has an intake valve 11.1 and an exhaust valve 11.2. Control device 9 is operatively connected to the at least one injector 5 and the at least one knocking sensor 7 and is designed for their respective control. Moreover, control device 9 is optionally connected to intake valve 11.1 and exhaust valve 11.2 and is designed for their respective control.

Control device 9 is arranged, in particular to implement a method to operate an internal combustion engine 1 according to one or several of the design examples described below.

Figure 2:
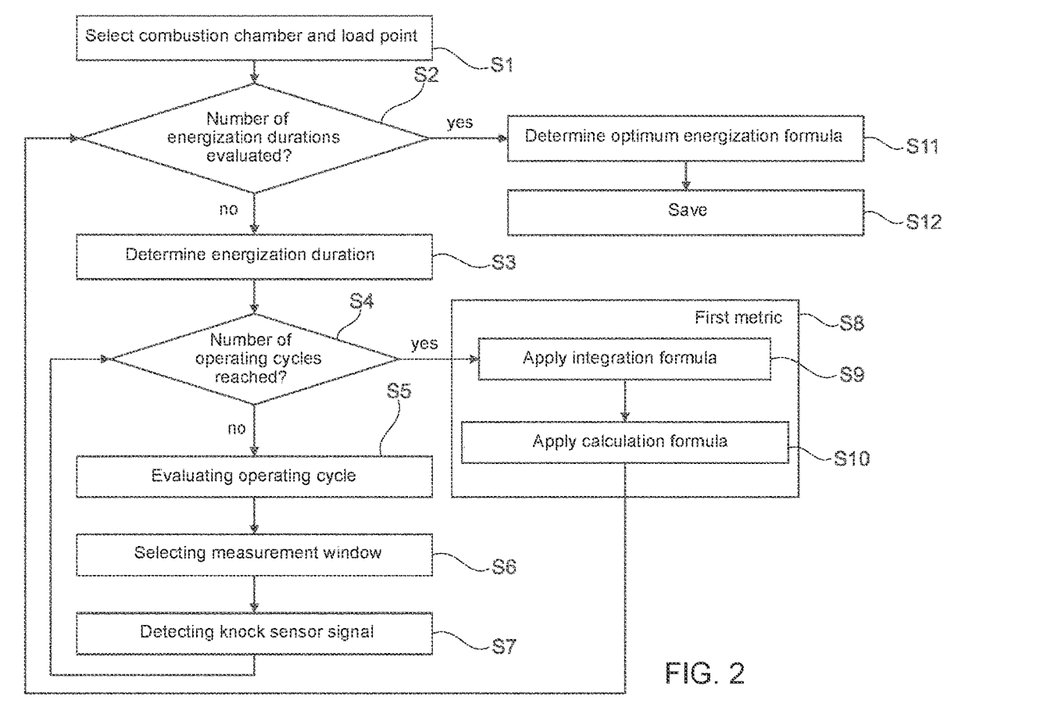
FIG. 2 is a flowchart of a first design example of a method for operating the internal combustion engine.

FIG. 2 shows a flowchart of a first design example of a method for operating internal combustion engine 1 according to FIG. 1.

Identical and functionally identical elements are provided with the same reference numbers in all drawings, so that reference is made in each applicable case to the previous description.

In step S1, a combustion chamber 3 of the at least one combustion chamber 3 of internal combustion engine 1 is selected in a particularly stationary load point, for which an optimization of a pre-injection is carried out by way of the at least one knocking sensor 7.

In step S2, it is checked whether a predetermined number of energization durations allocated to a pre-injection of injector 5 assigned to selected combustion chamber 3 has been evaluated. The predetermined number of energization durations allocated to the pre-injection is at least 2, whereby a first energization duration and a second energization duration are evaluated. The number of energization durations allocated to the pre-injection is optionally greater than 2.

If the predetermined number of energization durations has not yet been evaluated, an energization duration allocated to the pre-injection is determined in step S3 for the stationary load point and combustion chamber 3, which were selected in step S1, in particular the first energization duration or the second energization duration.

In step S4, a check is conducted as to whether a predetermined number of operating cycles per specified energization duration has been evaluated. Optionally, a majority of operating cycles, optionally at least 10 operating cycles, optionally at least 50 operating cycles, especially at least 100 operating cycles, are considered for the calculation of an evaluation point.

If a number of evaluated operating cycles is less than the predetermined number of operating cycles, a signal from knocking sensor 7 is evaluated in step S5 for an additional operating cycle of combustion chamber 3, in particular a period of −360° KW before ignition TDC to +359.99° KW after ignition TDC. In particular, a first signal is optionally evaluated for the first energization duration per operating cycle. In addition, a second signal is optionally evaluated for the second energization duration per operating cycle.

In step S6, a first temporal measurement window, optionally a period of −20° KW before ignition- to +60° KW after ignition-TDC, of the operating cycle is selected. In addition, a second temporal measurement window of the operating cycle is optionally selected, optionally a period of −20° KW before ignition TDC to −3° KW before ignition TDC.

In step S7, the signal, especially the first signal or the second signal of knocking sensor 7 is detected in the first temporal measurement window. In addition, the signal, especially the first signal or the second signal of knocking sensor 7 is optionally detected in the second temporal measurement window.

If the predetermined number of operating cycles for an energization duration has been evaluated, at least one signal is evaluated in step S8 by way of a first metric, in particular the at least one first signal or the at least one second signal, wherein an evaluation point is calculated. Optionally, a first evaluation point is calculated from the at least one first signal for the first energization duration and a second evaluation point from the at least one second signal for the second energization duration.

Optionally, the first metric in step S8 includes step S9, in particular an integration formula, and step S10, in particular a calculation rule.

If the predetermined number of energization durations assigned to the pre-injection has been evaluated, the optimum energization duration is determined in step S11 as the optimum of the majority of evaluation points, in particular of the first evaluation point and of the second evaluation point. Optionally, the optimum energization duration is determined in such a way that a peak pressure gradient in combustion chamber 3 is minimal. Alternatively, the optimum energization duration is optionally determined in such a way that there is a predetermined peak pressure gradient in combustion chamber 3.

In step S12, the optimum energization duration is stored together with the load point and combustion chamber 3, which were selected in step S1. The optimum energization duration for combustion chamber 3 is optionally set to the load point selected in step S1.

Optionally, a signal point, in particular the at least one first signal point or the at least one second signal point, is calculated from the signal of knocking sensor 7, in particular from the at least one first signal or the at least one second signal, by way of the integration formula in the step S9. Thus, when considering a majority of operating cycles, a majority of signal points, in particular a majority of first signal points or a majority of second signal points, are calculated successively using the integration formula.

Optionally, an evaluation point, in particular the first evaluation point or the second evaluation point, is calculated from the at least one signal point, in particular the at least one first signal point or the at least one second signal point, optionally from the majority of signal points, in particular the majority of first signal points or the majority of second signal points, by way of the calculation rule in step S10.

The integration formula in step S9 is optionally selected from a group consisting of an integral over the magnitude of the signal in the first temporal measurement window, an integral over the square of the signal in the first temporal measurement window, an integral over the magnitude of the signal in a second temporal measurement window, which is a part of the first temporal measurement window, and an integral over the square of the signal in the second temporal measurement window.

The calculation rule in step S10 is optionally an average of the signal points, in particular an average of the first signal points or an average of the second signal points, or a standard deviation of the signal points, in particular a standard deviation of the first signal points or a standard deviation of the second signal points.

Figure 3:
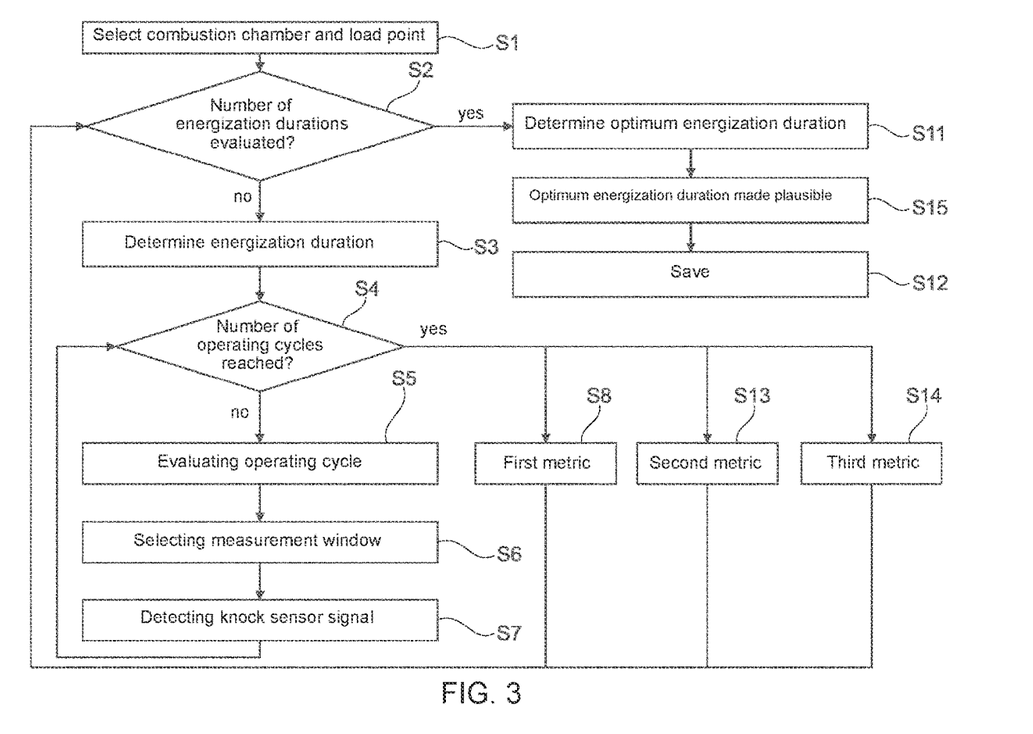
FIG. 3 is a flowchart of a second design example of the method for operating the internal combustion engine.

FIG. 3 shows a flowchart of a second design example of the method for operating internal combustion engine 1. The second embodiment of the method also includes steps S13, S14 and S15 in addition to steps S1-S12 of the first embodiment.

In step S13, the at least one signal, in particular the at least one first signal or the at least one second signal, is optionally evaluated by way of a second metric. The second metric has also optionally an integration formula, analogous to step S9, and a calculation rule, analogous to step S10.

Alternatively, or in addition, the at least one signal, in particular the at least one first signal or the at least one second signal, is evaluated optionally in step S14 by way of a third metric. The third metric also has optionally an integration formula, analogous to step S9, and a calculation rule analogous to step S10.

The first metric in step S8 optionally evaluates the at least one signal in the first temporal measurement window, wherein the calculation rule optionally includes the average value calculation. In addition, the second metric in step S13 optionally evaluates the at least one signal in the second temporal measurement window, wherein the/calculation rule optionally includes the average value calculation. In addition, the third metric in step S14 optionally evaluates the at least one signal in the first temporal measurement window or the second temporal measurement window, whereby the calculation rule optionally includes the standard deviation calculation.

Optionally, in step S15 the optimum energization duration determined in step S11 is made plausible and/or verified on the basis of the evaluation by way of the second metric and/or the third metric. If the optimum energization duration is made plausible and/or verified in step S15, the optimum energization duration is optionally stored in step S12 together with the load point and combustion chamber 3 selected in step S1.

Figure 4:
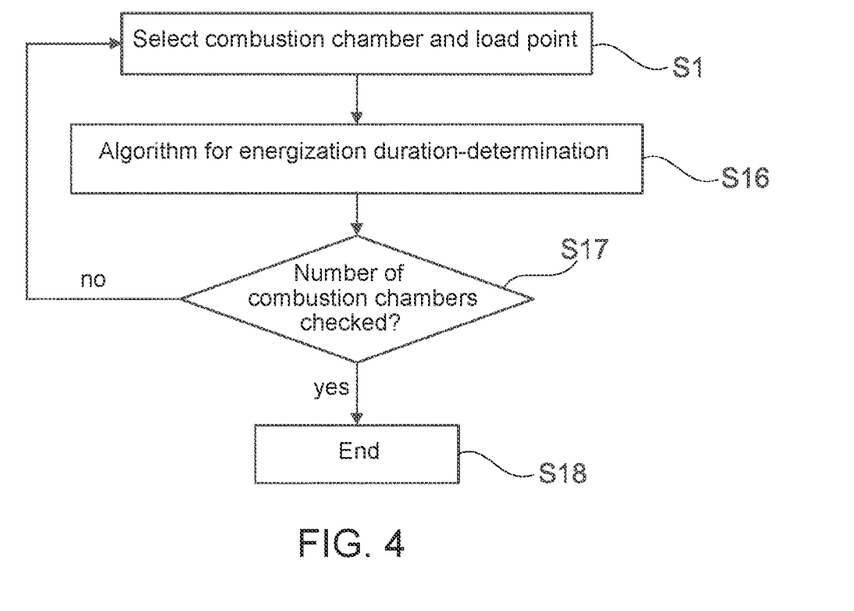
FIG. 4 is a flowchart of a third design example of the method for operating the internal combustion engine.

FIG. 4 shows a flowchart of a third design example of the method for operating the internal combustion engine.

In step S1, as in the first and second design examples, a combustion chamber 3 is selected at a stationary load point of combustion engine 1.

In step S16 the design example of the method in FIG. 2 is optionally carried out, especially steps S2 to S12. Alternatively, in step S16, the second design example of the method from FIG. 3, in particular steps S2 to S15, is optionally carried out.

In step 17 a check is made as to whether an optimum energization duration has been determined and/or stored for all combustion chambers 3 of internal combustion engine 1 at the load point from step S1.

If an optimum energization duration has been determined and/or is stored for all combustion chambers 3 of internal combustion engine 1, the process is completed in step S18.

If an optimum energization duration has not been determined and/or stored for combustion chamber 3 of internal combustion engine 1, steps S1, S16 and S17 are repeated.

Optionally, an optimum energization duration is determined iteratively for all combustion chambers 3 of internal combustion engine 1.

Alternatively, an optimum energization duration is determined simultaneously for all combustion chambers 3 of internal combustion engine 1, in particular by way of step S16.

Figure 5:
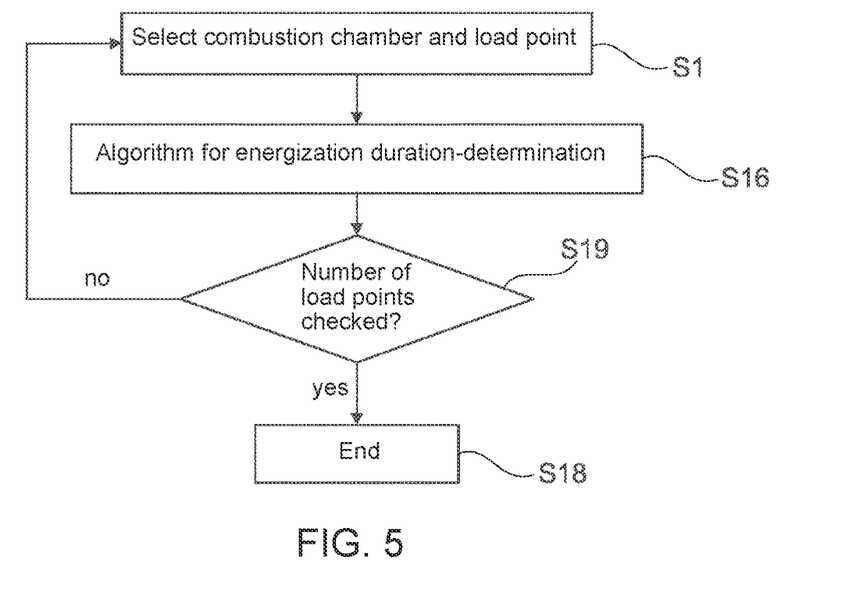
FIG. 5 is a flowchart of a fourth design example of the method for operating the internal combustion engine.

FIG. 5 is a flowchart of a fourth design example of the method for operating internal combustion engine 1.

The fourth design example differs from the third design example in that, after step 16 a check is made in step 19 whether an optimum energization duration has been determined and/or stored for selected combustion chamber 3 of internal combustion engine 1 from step S1 for all load points, in particular all predefined load points.

If an optimum energization duration was determined and/or stored for all predefined load points, the method is concluded in step S18.

If an optimum energization duration was not determined and/or stored for all load points, in particular for all predefined load points, steps S1, S16 and S19 are repeated.

In addition, a combination of the third and fourth design examples of the method is optionally feasible. Optionally, an optimum energization duration is determined and/or stored in particular iteratively for each combustion chamber 3 of the internal combustion engine for all respective load points, in particular all predefined load points.

Optionally, one design example selected from the design examples of the method from FIG. 2, FIG. 3, FIG. 4, and FIG. 5, is repeated cyclically, in particular after a predefined operating period of the internal combustion engine.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating an internal combustion engine, the internal combustion engine including at least one combustion chamber and at least one knock sensor, the at least one combustion chamber being that to which at least one injector is allocated, the method comprising the steps of:
   (a) detecting at least one first signal from the at least one knock sensor in a first temporal measurement window for a first load point and for a first energization duration, which is assigned to a pre-injection, of the at least one injector for at least one operating cycle of a first combustion chamber;
   (b) calculating a first first evaluation point from the at least one first signal by way of a first metric;
   (c) detecting at least one second signal from the at least one knock sensor in the first temporal measurement window for the first load point and for a second energization duration—which is assigned to the pre-injection of the at least one injector for the at least one operating cycle of the first combustion chamber;
   (d) calculating by way of the first metric a second first evaluation point from the at least one second signal;
   (e) determining an optimum energization duration as an optimum of the first first evaluation point and the second first evaluation point; and
   (f) at least one of storing and applying the optimum energization duration to the first load point and the first combustion chamber, wherein the at least one first signal and the at least one second signal are evaluated by way of at least one of a second metric and a third metric, and wherein the optimum energization duration is at least one of plausibility checked and verified by way of a majority of a plurality of signals evaluated with respect to at least one of the second metric and the third metric, the second metric and the third metric including both an integration formula and a calculation rule, which uses an average or standard deviation.

2. The method according to claim 1, wherein the method is additionally carried out for a majority of different energization durations assigned to the pre-injection.

3. The method according to claim 1, wherein (i) steps (a), (b), and (c) or (ii) steps (c) and (d) of the method are additionally carried out for a majority of different energization durations assigned to the pre-injection.

4. The method according to claim 1, wherein the method includes a plurality of the at least one operating cycle, wherein, for a majority of the plurality of operating cycles, the first signal is detected, and wherein, for a majority of the plurality of operating cycles, the second signal is detected.

5. The method according to claim 1, wherein the method includes a plurality of the at least one operating cycle, wherein, for at least 100 of the plurality of operating cycles, the first signal is detected, and wherein, for at least 100 of the plurality of operating cycles, the second signal is detected.

6. The method according to claim 1, wherein the first temporal measurement window is in a range of between $-20°$ KW before ignition-TDC to $+60°$ KW after ignition-TDC.

7. The method according to claim 1, wherein a majority of a plurality of second evaluation points is calculated by way of the second metric, and wherein a majority of a plurality of third evaluation points is calculated by way of the third metric.

8. The method according to claim 1, wherein the first metric has an integration formula and a calculation rule.

9. The method according to claim 1, wherein the integration formula is selected from a group consisting of (a) an integral over a magnitude of a signal in the first temporal measurement window, (b) an integral over a square of a signal in the first temporal measurement window, (c) an integral over a magnitude of a signal in a second temporal measurement window which is a part of the first temporal measurement window, and (d) an integral over a square of a signal in the second temporal measurement window.

10. The method according to claim 1, wherein the steps of (a), (b), (c), (d), (e), and (f) are carried out for a majority of a plurality of load points.

11. The method according to claim 1, wherein the internal combustion chamber includes a plurality of the at least one combustion chamber including the first combustion chamber, and wherein the method is carried out for a majority of the plurality of combustion chambers of the internal combustion engine.

12. The method according to claim 1, wherein the internal combustion chamber includes a plurality of the at least one combustion chamber including the first combustion chamber, and wherein the method is carried out simultaneously or iteratively for a majority of the plurality of combustion chambers of the internal combustion engine.

13. The method according to claim 1, wherein the method is repeated cyclically.

14. An internal combustion engine, comprising:
   at least one combustion chamber;
   at least one injector, which is assigned to the at least one combustion chamber;
   at least one knock sensor; and
   a control device, the control device being operatively connected with the at least one injector and the at least one knock sensor, being configured for controlling the at least one injector and the at least one knock sensor, and being configured for carrying out a method for operating the internal combustion engine, the method including the steps of:
   (a) detecting at least one first signal from the at least one knock sensor in a first temporal measurement window for a first load point and for a first energization duration, which is assigned to a pre-injection, of the at least one injector for at least one operating cycle of the at least one combustion chamber, which is a first combustion chamber;
   (b) calculating a first first evaluation point from the at least one first signal by way of a first metric;
   (c) detecting at least one second signal from the at least one knock sensor in the first temporal measurement window for the first load point and for a second energization duration—assigned to the pre-injection—of the at least one injector for the at least one operating cycle of the first combustion chamber;
   (d) calculating by way of the first metric a second first evaluation point from the at least one second signal;
   (e) determining an optimum energization duration as an optimum of the first first evaluation point and the second first evaluation point; and
   (f) at least one of storing and applying the optimum energization duration to the first load point and the first combustion chamber, wherein the at least one first signal and the at least one second signal are evaluated by way of at least one of a second metric and a third metric, and wherein the optimum energization duration is at least one of plausibility checked and verified by way of a majority of a plurality of signals evaluated with respect to at least one of the second metric and the third metric, the second metric and the third metric including both an integration formula and a calculation rule, which uses an average or standard deviation.

* * * * *